United States Patent [19]
Locklin et al.

[11] Patent Number: 5,676,764
[45] Date of Patent: Oct. 14, 1997

[54] LOW VAPOR PRESSURE SOLVENT

[75] Inventors: John M. Locklin, Long Beach; Paul A. Hatcher, Torrance; Mervin A. Danforth, Anaheim, all of Calif.

[73] Assignee: McDonnell Douglas Corporation, Huntington Beach, Calif.

[21] Appl. No.: 610,591

[22] Filed: Mar. 7, 1996

Related U.S. Application Data

[63] Continuation of Ser. No. 17,307, Feb. 12, 1993, abandoned.

[51] Int. Cl.$^6$ ............................ B08B 3/08; C23G 5/02
[52] U.S. Cl. ............................ 134/38; 134/40; 134/42; 252/364; 510/188; 510/201; 510/202; 510/245
[58] Field of Search .............................. 252/364; 510/202, 510/203, 245, 118, 134, 188, 201; 134/2, 32, 38, 40, 42

[56] References Cited

U.S. PATENT DOCUMENTS

| | | | |
|---|---|---|---|
| 2,327,701 | 8/1943 | Ellis et al. | 510/205 |
| 3,737,386 | 6/1973 | Geiss et al. | 510/204 |
| 3,811,884 | 5/1974 | Inoue et al. | 430/199 |
| 3,856,695 | 12/1974 | Geiss et al. | 510/204 |
| 4,023,983 | 5/1977 | Houke et al. | 134/11 |
| 4,309,300 | 1/1982 | Danforth et al. | 510/202 |
| 4,483,783 | 11/1984 | Albanese | 252/312 |
| 4,762,703 | 8/1988 | Abrutyn | 424/61 |
| 5,104,915 | 4/1992 | Paci | 524/32 |
| 5,409,994 | 4/1995 | Nakao et al. | 525/160 |
| 5,437,808 | 8/1995 | Weltman et al. | 510/407 |

*Primary Examiner*—Joseph D. Anthony
*Attorney, Agent, or Firm*—Bell, Seltzer, Park & Gibson, P.A.

[57] ABSTRACT

An advantageous effective cleaning solvent consisting essentially, according to one embodiment, of methyl ethyl ketone, methyl isobutyl ketone, isopropyl alcohol, toluene and n-butyl acetate, in certain ranges of proportions. Water also is included to aid in reducing the vapor pressure of the solvent. The composite vapor pressure of the solvent, at 20° C., neglecting the vapor pressure contribution of water, is not greater than 35 mm of mercury. The invention solvent is particularly effective as a paint cleaner, e.g. for cleaning paint guns.

3 Claims, No Drawings

LOW VAPOR PRESSURE SOLVENT

This Application is a continuation of our U.S. patent application Ser. No. 08/017,307, filed Feb. 12, 1993 now abandoned for a Low Vapor Pressure Solvent;

BACKGROUND OF THE INVENTION

In industry generally a commonly recognized need for solvents for cleaning has long existed. The best of these solvents will be in the form of a composition having the desired solvency characteristics. However, many of the most useful solvents have been determined by regulatory agencies to be harmful to human health or the environment. Most of the chemical components potentially environmentally harmful are light and have low boiling points. A low boiling point generally indicates a high vapor pressure, and therefore the tendency to escape from the solvent mixture into a polluting relationship with the environment. This is particularly true for wiping solvents wherein the solvent and the structure to be cleaned cannot be physically isolated from the environment.

Solvents containing methylene chloride are becoming less usable as a wiping solvent with their presence on the Environmental Protection Agency's toxics list. In addition, methylene chloride destroys plastic surfaces. It cannot be used to prepare painted surfaces since it will remove most paints. 1,1,1-trichloroethane is a less powerful solvent than methylene chloride and is also toxic.

One of the criteria for specification of a solvent is its vapor pressure at 20 degrees centigrade. The vapor pressure gives some indication of the rate of evaporation, and therefore the rate of emission of the polluting component into the environment. The rules for employment of the maximum vapor pressure standard typically allow for neglecting the vapor pressure contribution of water or other commonly occurring non-polluting inerts because it is well known that water has a low vapor pressure and that the addition of water will lower the vapor pressure. Indeed, since the rules of the vapor pressure standards of most jurisdictions allow the assignment of zero vapor pressure for the water contribution, they have actively been encouraging this practice by the public. It is also known that water can severely limit the effectiveness of most solvent mixtures. Therefore, the real need in the industry is for the proper combination of chemicals which, in the presence of the vapor pressure reducing contribution of water, still form an effective solvent. However, even though the zero vapor pressure allowance for water is made, given an artificially wide latitude to the possible chemicals which can be mixed with water to form a solvent, many solvents thus formed, even though they meet the vapor pressure standards, unfortunately do not constitute an effective cleaning solvent.

Environmental authorities have previously required that cleaning solvents used to clean the equipment and tools used to manufacture an aircraft have a vapor pressure of no more than 45 millimeters of mercury at 20° C. The cleaning solvent disclosed and claimed in copending application Ser. No. 619,405, filed Nov. 29, 1990, by Keven D. Jeter and Herbert K. Ickes, now abandoned and assigned to the same assignee as the present application, was designed as a wiping solvent for this purpose. Such cleaning solvent consists essentially of methyl ethyl ketone, a propyl alcohol, a butyl acetate, toluene and optionally water, in certain ranges of proportions. However, recent more stringent environmental regulations now specify that such cleaning solvents have a composite vapor pressure no greater than 35 millimeters of mercury at 20° C.

Accordingly, one object of the invention is the provision of an effective cleaning solvent having a low vapor pressure of not more than 35 mm mercury at 20° C.

Another object is to provide a wiping solvent having the above characteristics and effective for cleaning organic coatings from substrate surfaces, and particularly effective for cleaning coatings and adhesives application equipment, e.g. paint guns employed in the aircraft industry.

A still further object is the provision of a method for cleaning substrate surfaces, particularly painted surfaces, employing the improved wiping solvent of low vapor pressure noted above.

SUMMARY OF THE INVENTION

The above objects are achieved according to the invention by the provision of a solvent which consists essentially of methyl ethyl ketone, methyl isobutyl ketone, a propyl alcohol, toluene and a butyl acetate, in the proportions set forth in further detail hereinafter. Water is also included to aid in reducing the vapor pressure of the solvent. In order to meet more stringent vapor pressure requirements, the amount of water may be increased somewhat without a substantial loss of solvent characteristics. The proportions of the methyl ethyl ketone, methyl isobutyl ketone, propyl alcohol, toluene and butyl acetate components may be varied relative to each other to optimize the solvent characteristics for the particular application.

The present invention provides a superior solvent which has reduced vapor pressure characteristics, yet retains excellent solvent characteristics. The solvent of the present invention is designed to have a vapor pressure of no more than 35 millimeters of mercury at 20 degrees centigrade.

Although the methyl ethyl ketone is the most effective cleaning component of the cleaning solvent of the above 619,405 application, it has a relatively high vapor pressure of about 70 mm mercury at 20° C. It has now been found that by substituting methyl isobutyl ketone for a portion of the methyl ethyl ketone in the composition of the 619,405 application, the solvent effectiveness of the composition can still be substantially maintained while reducing the composite vapor pressure of the solvent to not more than 35 mm mercury at 20° C., due to the low vapor pressure of only about 15 mm mercury at 20° C. for methyl isobutyl ketone.

In the calculation procedure typically adopted by environmental authorities, the vapor pressure contribution of water, when present, is neglected completely; that is, it is assigned a value of zero. This would allow the composite vapor pressure of the invention solution to become more rapidly diminished as the composition is changed to a greater proportion of water, but the proportion of water should be such that the resulting solution still retains the desired solvent properties.

The solvent of the present invention has been successfully used as a wiping solvent particularly to clean contamination and coatings from substrate surfaces such as metals, e.g. aluminum, stainless steel, and the like, prior to application of organic coatings, adhesives or sealants, and prior to welding. The invention solvent can also be used to clean metal surfaces prior to painting, to clean primed or painted surfaces without removing the coating, and to clean aluminum parts prior to anodizing. The invention solvent is particularly effective for cleaning fresh paint from metal substrate surfaces, and especially for cleaning coatings and adhesives application equipment, e.g. paint guns, as utilized in the aircraft industry.

DETAILED DESCRIPTION OF THE INVENTION AND PREFERRED EMBODIMENTS

As noted above, the essential components of the solvent of the present invention are methyl ethyl ketone, methyl isobutyl ketone, a propyl alcohol, a butyl acetate and toluene, and with some water also present. The propyl alcohol can be either n-propyl alcohol or isopropyl alcohol, the latter being preferred. Also, the butyl acetate can be either n-butyl acetate or isobutyl acetate, the former being preferred.

The components of the solvent are employed in the following ranges of proportions in volume percent.

TABLE I

Ranges of Proportions of Components (% by Vol.)

about 35 to about 41% methyl ethyl ketone,
about 20 to about 25% methyl isobutyl ketone,
about 5 to about 20% of a propyl alcohol,
about 5 to about 20% toluene,
about 5 to about 20% of a butyl acetate, and
about 4 to about 6% water It is readily apparent from the above table that in order to maintain the same vapor pressure, the differential volume percentage of one component can be increased while the volume percentage of another component can be decreased in proportion to the relative vapor pressures of the components. In any event, the proportions of the components are selected within the above ranges so as to maintain the vapor pressure of the solvent not above 35 millimeters of mercury at 20° C. Thus, if the amount of butyl acetate is raised and the amount of toluene and/or isopropyl alcohol reduced, the composite vapor pressure will fall in view of the substantially lower vapor pressure of butyl acetate as compared to toluene and isopropyl alcohol, while still maintaining an effective amount of methyl ethyl ketone, which has the highest vapor pressure of the components of the solvent, and exhibits superior solvent properties. Thus, an effective amount of methyl ethyl ketone, as well as methyl isobutyl ketone of low vapor pressure, are still provided to maintain the desired dissolution ability of the solvent without raising the theoretical vapor pressure of the solvent above 35 mm of Hg at 20° C.

In addition to serving as a polar cleaning solvent, water, e.g. deionized water, is added to the solvent composition of the invention to reduce the mole fraction of the other components in the mixture, thereby lowering the composite vapor pressure of the mixture. An effective amount of water is present in the solvent mixture to reduce the theoretical vapor pressure of the solvent to below 35 mm Hg at 20° C., such theoretical vapor pressure designating water as having a negligible vapor pressure, that is, a vapor pressure of zero millimeters of mercury, as noted above. The water employed can be ordinary tap water, but is preferably distilled, demineralized or deionized water.

In any event, the proportions of the components in the solvent mixture are maintained so that the solvent has effective dissolving power while meeting the requirement of having a vapor pressure at or below 35 mm of Hg. at 20° C., so that the solvent blend hereof has substantially reduced toxicity.

There is illustrated in the table below and designated "Composition A", a typical formulation which meets a maximum vapor pressure limit of 35 millimeters of mercury at 20 degrees centigrade. The calculation assigns a value of zero to the vapor pressure of water, even though it would be about 15 millimeters of mercury at 20 degrees centigrade. This is emphasized below by insertion of the word "zero" in the calculation table. The composite vapor pressure calculation performed with an assigned zero value of the water vapor pressure contribution is referred to herein as theoretical vapor pressure.

TABLE II

| Composition A | Vol % | Vapor Pressure (20° C.) | Partial Pressure (20° C.) |
| --- | --- | --- | --- |
| Methyl Ethyl Ketone | 38 | 70.21 | 24.20 |
| Methyl Isobutyl Ketone | 24 | 14.96 | 2.33 |
| Isopropyl Alcohol | 13 | 32.8 | 4.52 |
| Toluene | 10 | 25.4 | 1.94 |
| n-Butyl Acetate (90–92%) | 10 | 7.8 | 0.48 |
| Deionized water | 5 | zero | zero |
| TOTALS: | 100 | | 33.47 |

It is readily apparent from the above Table II that in order to maintain the same vapor pressure for the composition, the differential percentage of one component of the composition could be increased while the percentage of another component could be decreased in proportion to the relative vapor pressures of the components.

In use, the cleaning composition hereof, e.g. Composition A, can be applied by pouring or wiping same on the substrate surface, e.g. metal, to be cleaned, and the solvent is maintained on the surface for a period sufficient to thoroughly clean such surface. This requires only a matter of minutes, e.g. about 1 to about 5 minutes. The solvent is then removed as by wiping dry with a clean cloth, leaving a clean grease-free and dirt-free surface. The substrate alternatively can be immersed in the invention solvent, and the solvent wiped from the surface with a cloth. Usually the solvent is applied to a cloth and the solvent soaked cloth is used to wipe the surface, e.g. painted surface, clean.

The solvent of the invention is particularly useful for cleaning relatively fresh paint from painted substrates. Thus, for example, oversprayed paint on a previously painted surface can be removed by the solvent of the invention without damaging or stripping the old paint from the previously painted surface. Accordingly, the invention solvent functions as a paint cleaner rather than as a paint stripper. The invention solvent is particularly effective for cleaning coatings and adhesives application equipment, that is, paint guns, and other paint and adhesives application equipment.

The following are examples of practice of the invention:

EXAMPLE 1

A dirty conventional type paint gun was immersed in a bath of Composition A and cleaned with a Scotch Brite pad.

Three Bird applicators that were used to apply epoxy primer were also similarly cleaned with Composition A.

Stirrers used for mixing a semi-gloss water base paint were also cleaned in a similar manner with Composition A.

The conventional paint gun cleaned satisfactorily except for a single chunk of paint that had been on the gun for some time.

The three Bird applicators were satisfactorily cleaned with the solvent Composition A.

The stirrers were also satisfactorily cleaned with Composition A.

EXAMPLE 2

Bare aluminum panels were each respectively spray painted with an exterior polyurethane topcoat, an exterior epoxy primer and an interior waterbase paint topcoat. The panels were solvent wiped while still wet using white, lint-free, 100% cotton cleaning wiper cloths soaked with Composition A. Composition A was also similarly used for cleaning the wet paint off the spray guns after each spraying.

Similarly spray painted panels were treated in the manner noted above with a variety of other proprietary cleaning solvents listed as follows:

TABLE III

| SOLVENT NAME | MANUFACTURER |
|---|---|
| Turco EDG-1 | Turco Products, Inc. |
| Turco EDG-2 | " |
| Turco 6759 | " |
| Ardrox 1070-K | Ardrox, Inc. |
| Ardrox 5522 | " |
| Ardrox 5523 | " |
| DeSoto 020X439 | DeSoto Aerospace Coatings, Inc. |
| DeSoto 906T200 | " |

In the above solvent cleaning tests on the painted panels, Composition A outperformed all of the solvent mixtures of Table III in cleaning effectiveness, especially on the waterbase paint, and Composition A also had superior effectiveness over the other solvents of Table III in cleaning the wet paint from the spray guns. None of the solvents stripped the cured paint from the spray guns.

It has been found that the cleaning formulation of the present invention containing a combination of methyl ethyl ketone and methyl isobutyl ketone as chief cleaning components has substantially the same cleaning effectiveness as the cleaning solvent of the above 619,405 Jeter et al application, containing only methyl ethyl ketone as chief cleaning component and employed in much larger proportions than the methyl ethyl ketone component of the present invention solvent, while at the same time the invention solvent meets the present more stringent regulations of environmental authorities in having a low composite vapor pressure of not more than 35 mm mercury pressure at 20° C.

From the foregoing, it is seen that the invention provides an effective essentially all-purpose cleaning solvent having very low vapor pressure, yet which can be designed to provide the desired solvent effectiveness, and which can be employed for both manual and automated cleaning operations.

Since various changes and modifications of the invention will occur to those skilled in the art within the spirit of the invention, the invention is not to be taken as limited except by the scope of the appended claims.

What is claimed is:

1. A method for removing fresh paint from a previously painted substrate surface without damaging and without stripping cured paint from the previously painted surface, the method comprising the steps of:

applying a low vapor pressure wiping solvent to paint which has been freshly applied to a previously painted substrate surface, wherein the low vapor pressure solvent is effective to meet environmental standards of having a low vapor pressure of not more than 35 mm of mercury at 20° C. with water having an assigned relative value of 0 mm of mercury at 20° C. vapor pressure, said solvent consisting essentially of:

about 35 to about 41% methyl ethyl ketone, about 20 to about 25% methyl isobutyl ketone, about 5 to about 20% of a propyl alcohol, about 5 to about 20% toluene, about 5 to about 20% of a butyl acetate, and about 4 to about 6% water; and removing the solvent and the freshly applied paint from the surface without damaging and without stripping the previously applied paint from the surface.

2. The method as defined in claim 1, said substrates being coatings and adhesives application equipment.

3. The method as defined in claim 1, said solvent consisting essentially of the following components in percent by volume:

| | |
|---|---|
| methyl ethyl ketone | 38 |
| methyl isobutyl ketone | 24 |
| isopropyl alcohol | 13 |
| toluene | 10 |
| n-butyl acetate | 10 |
| water | 5. |

\* \* \* \* \*